United States Patent
Kim et al.

(10) Patent No.: US 12,344,719 B2
(45) Date of Patent: Jul. 1, 2025

(54) POLYESTER FILM AND FOLDABLE DISPLAY DEVICE COMPRISING THE SAME

(71) Applicant: SK microworks Co., Ltd., Gyeonggi-do (KR)

(72) Inventors: Gun Uk Kim, Gyeonggi-do (KR); Sang Min Choi, Gyeonggi-do (KR); Jin-Seok Park, Gyeonggi-do (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 113 days.

(21) Appl. No.: 18/317,097

(22) Filed: May 15, 2023

(65) Prior Publication Data

US 2023/0407022 A1    Dec. 21, 2023

(30) Foreign Application Priority Data

Jun. 17, 2022    (KR) .................. 10-2022-0073978

(51) Int. Cl.
| | |
|---|---|
| *C08J 5/18* | (2006.01) |
| *B32B 17/10* | (2006.01) |
| *B32B 27/08* | (2006.01) |
| *B32B 27/28* | (2006.01) |
| *B32B 27/36* | (2006.01) |
| *G09F 9/30* | (2006.01) |

(52) U.S. Cl.
CPC .................. *C08J 5/18* (2013.01); *B32B 17/10* (2013.01); *B32B 27/08* (2013.01); *B32B 27/281* (2013.01); *B32B 27/36* (2013.01); *G09F 9/301* (2013.01); *B32B 2250/02* (2013.01); *B32B 2250/24* (2013.01); *B32B 2307/412* (2013.01); *B32B 2457/20* (2013.01); *C08J 2367/02* (2013.01)

(58) Field of Classification Search
None
See application file for complete search history.

(56) References Cited

U.S. PATENT DOCUMENTS

| | | | |
|---|---|---|---|
| 11,642,825 | B2 | 5/2023 | Yu et al. |
| 2021/0124090 | A1 | 4/2021 | Kim et al. |
| 2022/0251425 | A1 | 8/2022 | Yoo et al. |

FOREIGN PATENT DOCUMENTS

| | | | |
|---|---|---|---|
| JP | 2010-131974 A | | 6/2010 |
| JP | 2018028036 A | * | 2/2018 |
| JP | 2021-066882 A | | 4/2021 |
| KR | 1020200080788 A | * | 7/2020 |
| KR | 10-2021-0059629 A | | 5/2021 |
| KR | 10-2021-0118512 A | | 10/2021 |
| KR | 10-2309520 B1 | | 10/2021 |
| WO | 2013/111641 A1 | | 8/2013 |
| WO | 2019/202992 A1 | | 10/2019 |

OTHER PUBLICATIONS

Machine translation of KR 10-2020-0080788 A (Year: 2020).*
Machine translation of JP 2018-028036 A (Year: 2018).*

* cited by examiner

*Primary Examiner* — Ramsey Zacharia
(74) *Attorney, Agent, or Firm* — IP & T GROUP LLP

(57) ABSTRACT

The embodiments relate to a polyester film, and a laminate and a foldable display device comprising the same. As the polyester film has a yield elongation in a specific range, it can be excellent in folding characteristics, along with high surface hardness.

11 Claims, 3 Drawing Sheets

POLYESTER FILM AND FOLDABLE DISPLAY DEVICE COMPRISING THE SAME

CROSS-REFERENCE TO RELATED APPLICATION(S)

This patent document claims the priority and benefits of Korean Patent Application No. 10-2022-0073978 filed on Jun. 17, 2022, the disclosure of which is incorporated herein by reference in its entirety.

TECHNICAL FIELD

Embodiments relate to a polyester film capable of exhibiting enhanced surface hardness, along with excellent transparency, flexibility, folding characteristics, and the like, and a laminate and a foldable display device comprising the same.

BACKGROUND ART

In recent years, foldable display devices that can be flexibly folded in response to an external force are attracting attention in the field of mobile devices that require large screens and portability at the same time. Such a foldable display device has great advantages in that it is folded to a small size to enhance its portability when not in use, and it is unfolded to form a large screen when used.

Such foldable display devices are being developed as an in-folding type (1) in which a screen is positioned inside the folding direction and an out-folding type (2) in which a screen is positioned outside the folding direction (see FIG. 3). As a transparent substrate (200) applied as a cover window of these foldable display devices, a polyimide-based film was initially mainly used in the in-folding type (1), and ultra-thin glass (UTG) was used in the out-folding type (2). In recent years, since ultra-thin glass (UTG) is improved in its physical properties to exhibit superior characteristics as compared with polyimide-based films, ultra-thin glass (UTG) is mostly used even in an in-folding type (1).

However, ultra-thin glass (UTG) used as a transparent substrate (200) is still highly likely to form cracks or the like by an external impact. Therefore, a protective film (100) is applied to the surface of a transparent substrate (200) to mitigate an impact, prevent scattering, prevent scratches, and the like.

A polyester film is mainly used as the protective film (100). However, the polyester films developed up to the present have a limitation in that they cannot show a satisfactory level of surface hardness as a protective film. That is, in order to increase the surface hardness, it is necessary to increase the thickness of a polyester film. As the thickness of a polyester film becomes thicker, cracks are formed in the repeatedly folded area (a, b in FIG. 3), thereby deteriorating the folding characteristics, which makes it difficult to increase the thickness of a polyester film. As a result, there is a limit to securing the required surface hardness.

PRIOR ART DOCUMENT (Patent Document 1) Korean Laid-open Patent Publication No. 2021-0059629

DISCLOSURE OF INVENTION

Technical Problem

The embodiments aim to provide a polyester film capable of exhibiting enhanced surface hardness, along with excellent transparency, flexibility, folding characteristics, and the like.

In addition, the embodiments aim to provide a laminate and a foldable display device manufactured using the polyester film.

Solution to Problem

According to an embodiment to solve the above problem, there is provided a polyester film, wherein when a first direction and a second direction perpendicular to each other are defined in the plane of the film, the yield elongation in at least one direction of the first direction and the second direction is 2.2 to 2.6%, and the thickness is 80 to 150 μm.

According to another embodiment, there is provided a laminate, which comprises a transparent substrate; and a polyester film disposed on the transparent substrate, wherein when a first direction and a second direction perpendicular to each other are defined in the plane of the polyester film, the yield elongation in at least one direction of the first direction and the second direction is 2.2 to 2.6%, and the thickness of the film is 80 to 150 μm.

According to another embodiment, there is provided a foldable display device, which comprises a foldable display panel; a transparent substrate disposed on the foldable display panel; and a polyester film disposed on the transparent substrate, wherein when a first direction and a second direction perpendicular to each other are defined in the plane of the polyester film, the yield elongation in at least one direction of the first direction and the second direction is 2.2 to 2.6%, and the thickness of the film is 80 to 150 μm.

Advantageous Effects of Invention

According to the embodiment, as the yield elongation of a polyester film is controlled within a specific range, flexibility and folding characteristics may be excellent even when the polyester film is relatively thick. Thus, the polyester film can have enhanced surface hardness.

Accordingly, when the polyester film according to the embodiment is applied as a protective film of a foldable display device, it is possible to effectively prevent scratches or mitigate an impact applied to the foldable display device while maintaining its original characteristics even after repeated folding of multiple times.

BEST MODE FOR CARRYING OUT THE INVENTION

Figure 1:
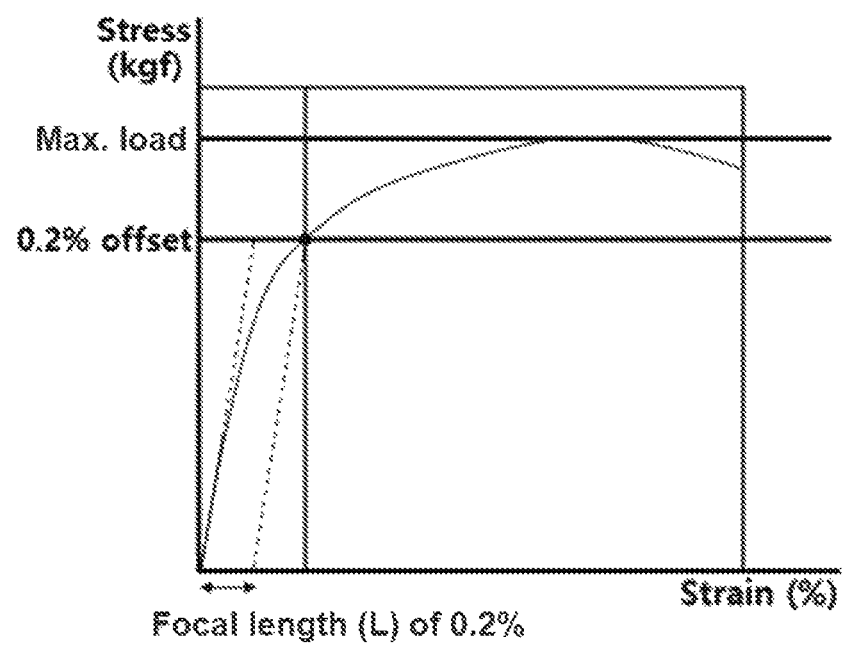
FIG. 1 is a reference drawing for illustrating the yield elongation of a polyester film according to an embodiment.

Hereinafter, the present invention will be described with reference to embodiments. Here, the embodiments are not limited to those described below. Rather, they can be modified into various forms as long as the gist of the invention is not altered.

In the present specification, in the case where an element is mentioned to be formed, connected, or combined on or under another element, it means all of the cases where one element is directly, or indirectly through another element, formed, connected, or combined with another element. In addition, it should be understood that the criterion for the terms on and under for each component may vary depending on the direction in which the object is observed.

In the present specification, the term "comprising" is intended to specify specific features, regions, steps, processes, elements, and/or ingredients. Unless specifically stated to the contrary, the presence or addition of other features, regions, steps, processes, elements and/or ingredients is not excluded.

All numbers and expressions related to the quantities of components, reaction conditions, and the like used herein are to be understood as being modified by the term "about" unless otherwise indicated.

Throughout the present specification, the terms first, second, and the like are used to describe various components. But the components should not be limited by the terms. The terms are used only for the purpose of distinguishing one component from another.

For the sake of description, the sizes of individual elements in the appended drawings may be exaggeratedly depicted, and they may differ from the actual sizes.

A polyester film to be used as a protective film needs to be relatively thick to increase the surface hardness in order to enhance the effects of impact mitigation and scratch prevention. As a polyester film becomes thicker, it would cause a problem in that folding characteristics are deteriorated. In order to increase the surface hardness of a polyester film, a hard coating layer is formed on the surface, but a satisfactory level of surface hardness is not achieved due to limitations in the components and the coating thickness of the hard coating layer.

Accordingly, as a result of the various studies conducted by the present inventors to secure folding characteristics even when the thickness of a polyester film is increased, it has been discovered that folding characteristics are secured even at a relatively thick thickness by controlling the yield elongation of a polyester film within a specific range.

In the following embodiments, a polyester film having a relatively thick thickness and exhibiting high surface hardness, along with excellent folding characteristics, flexibility, transparency, and the like, a laminate and a foldable display device comprising the polyester film will be described.

Polyester Film

Physical Properties of the Polyester Film

The polyester film according to an embodiment may have a yield elongation of 2.2 to 2.6%. Specifically, when a first direction and a second direction perpendicular to each other are defined in the plane of the polyester film, the yield elongation in at least one direction of the first direction and the second direction may be 2.2 to 2.6%, 2.21 to 2.6%, 2.22 to 2.6%, 2.25 to 2.6%, 2.28 to 2.58%, 2.29 to 2.57%, or 2.3 to 2.55%. If the yield elongation is within the above range, it is possible to provide a polyester film having a required level of elongation, along with excellent folding characteristics and high surface hardness. Specifically, if the yield elongation of the polyester film is less than 2.2%, the folding characteristics may deteriorate. If it exceeds 2.6%, the elongation is significantly deteriorated, so that the polyester film may be easily broken in the course of being pulled or bent.

The yield elongation may refer to the tensile strain at a yield point, which means a point at which elastic force is lost and permanent deformation starts. Here, since the yield point of a polyester film, which is a polymer material, is not clearly acknowledged, the tensile strain at an offset yield point of 0.2% is defined as the yield elongation of a polyester film in the embodiment. The offset yield point of 0.2% may refer to a point where the straight-line portion in which the tensile elongation (strain) increases linearly from 0% is shifted to the point of 0.2% in the gauge distance (focal length) of the specimen before tension (see FIG. 1).

Meanwhile, the first direction may be any direction in the plane of the polyester film, and the second direction may refer to a direction in the plane of the film perpendicular to the first direction. Specifically, the first direction may be the longitudinal direction (Machine direction; MD) or the transverse direction (width direction; TD) of the polyester film, and the second direction may be the transverse direction (TD) or the longitudinal direction (MD) perpendicular thereto. More specifically, the first direction may be the longitudinal direction (MD) of the polyester film, and the second direction may be the transverse direction (TD) of the polyester film.

According to an embodiment, the yield elongation may be the yield elongation ($E_1$) in the longitudinal direction (MD). That is, the polyester film according to an embodiment may be a polyester film having a yield elongation ($E_1$) in the longitudinal direction (MD) of 2.2 to 2.6% (specifically, 2.21 to 2.6%, 2.22 to 2.6%, 2.25 to 2.6%, 2.28 to 2.58%, 2.29 to 2.57%, or 2.3 to 2.55%) and satisfying the following Relationship (1).

$$1.1 \leq E_1/E_2 \leq 1.4 \quad (1)$$

In Relationship (1), $E_1$ is the yield elongation in the longitudinal direction (MD), and $E_2$ is the yield elongation in the transverse direction (TD).

Specifically, the ratio of $E_1/E_2$ in Relationship (1) may be 1.14 to 1.39, 1.15 to 1.37, 1.18 to 1.35, 1.18 to 1.33, 1.19 to 1.30, or 1.19 to 1.28.

In addition, the polyester film according to an embodiment may be a polyester film having a yield elongation ($E_1$) in the longitudinal direction (MD) of 2.2 to 2.6% (specifically, 2.21 to 2.6%, 2.22 to 2.6%, 2.25 to 2.6%, 2.28 to 2.58%, 2.29 to 2.57%, or 2.3 to 2.55%) and satisfying the following Relationship (2).

$$0.01 \leq D_1 \times E_1/T \leq 0.1 \quad (2)$$

In Relationship (2), $D_1$ is the stretching ratio in the longitudinal direction (MD), $E_1$ is the yield elongation in the longitudinal direction (MD), and T is the thickness of the polyester film.

Specifically, the ratio of $D_1 \times E_1/T$ (the ratio of $(D_1 \times E_1)/T$) in Relationship (2) may be 0.02 to 0.098, 0.03 to 0.095, 0.04 to 0.094, 0.05 to 0.092, 0.06 to 0.091, or 0.07 to 0.09.

When the polyester film satisfies Relationships (1) and/or (2), it is possible to have excellent folding characteristics, high surface hardness, and a required level of elongation, thereby securing flexibility.

Meanwhile, the polyester film according to an embodiment may have a thickness deviation of 3 µm or less. Specifically, the thickness deviation of the polyester film may be 2.5 µm or less, 2.3 µm or less, 2.2 µm or less, 2 µm or less, 1.8 µm or less, or 1.5 µm or less.

In addition, the polyester film according to an embodiment may have an elongation of 40% or more. Specifically, the elongation of the polyester film may be 40 to 200%, 50 to 190%, 60 to 180%, 70 to 170%, 80 to 160%, or 100 to 160%. As the elongation is within the above range, the flexibility and folding characteristics of the polyester film may be excellent.

In addition, the polyester film according to an embodiment may have a haze of 2.0% or less. Specifically, the haze of the polyester film may be 0.4 to 2.0%, 0.4 to 1.8%, 0.5 to 1.5%, 0.5 to 1.3%, or 0.6 to 1.0%. As the haze is within the above range, the transparency and optical characteristics of the polyester film may be excellent.

In addition, the polyester film according to an embodiment may have a surface hardness of 120 $N/mm^2$ or more. Specifically, the surface hardness of the polyester film may be 120 to 180 $N/mm^2$, 125 to 175 $N/mm^2$, 130 to 170 $N/mm^2$, 135 to 170 $N/mm^2$, or 140 to 160 $N/mm^2$. As the surface hardness is within the above range, the polyester film can be advantageously used as a protective film.

In addition, the polyester film according to an embodiment may have an in-plane retardation (Ro) of 4,000 or less, 3,500 or less, or 3,000 or less. Specifically, the in-plane retardation (Ro) of the polyester film may be 500 to 4,000, 600 to 3,500, or 700 to 3,000. As the in-plane retardation (Ro) is within the above range, rainbow stains that may appear in the polyester film can be minimized.

In addition, the polyester film according to an embodiment may have a thickness direction retardation (Rth) of 6,000 or more, 7,000 or more, or 8,000 or more. Specifically, the thickness direction retardation (Rth) of the polyester film may be 6,000 to 14,000, 7,000 to 13,000, or 8,000 to 12,000. As the thickness direction retardation (Rth) is within the above range, rainbow stains that may appear in the polyester film can be minimized.

Here, the in-plane retardation (Ro) may be a parameter defined by a product ($\Delta nxy \times d$) of anisotropy ($\Delta nxy=|nx-ny|$) of refractive indices of two mutually perpendicular axes in a plane of a film and the film thickness (d).

In addition, the thickness direction retardation (Rth) may be a parameter defined by a product of an average of the two birefringences $\Delta nxz$ ($=|nx-nz|$) and $\Delta nyz$ ($=|ny-nz|$) observed on a cross-section in the film thickness direction and the film thickness (d).

Characteristics of the Polyester Film

The polyester film according to an embodiment may have a thickness of 80 μm or more. Specifically, the thickness of the polyester film may be 80 to 150 μm, 83 to 140 μm, 85 to 135 μm, 90 to 120 μm, 95 to 110 μm, or 95 to 105 μm. As the thickness is within the above range, it is possible to provide a polyester film having high surface hardness while minimizing the formation of cracks in the folding area even when repeated folding is performed multiple times (e.g., 200,000 times or more).

In addition, the polyester film according to an embodiment may be a biaxially stretched film. The polyester film may be a film stretched at a stretching ratio ($D_1$) of 2.5 to 3.0 in the longitudinal direction (MD) and stretched at a stretching ratio ($D_2$) of 3.5 to 5.5 in the transverse direction (TD). The stretching ratio ($D_1$) in the longitudinal direction (MD) may specifically be 2.5 to 2.9, 2.5 to 2.8, or 2.5 to 2.7. In addition, the stretching ratio ($D_2$) in the transverse direction (TD) may specifically be 3.5 to 5.4, 3.7 to 4.9, or 4.3 to 4.8. As the stretching ratios ($D_1$, $D_2$) in the longitudinal direction (MD) and/or the transverse direction (TD) are within the above ranges, even if the polyester film is relatively thick (e.g., 80 μm or more), the yield elongation is controlled at a required level, whereby it is possible to provide a polyester film with excellent folding characteristics.

In addition, the polyester film according to an embodiment may have a ratio ($D_2/D_1$) of the stretching ratio ($D_2$) in the transverse direction (TD) to the stretching ratio ($D_1$) in the longitudinal direction (MD) of 1.3 to 1.8. Specifically, the ratio ($D_2/D_1$) may be 1.3 to 1.75, 1.3 to 1.65, 1.33 to 1.6, 1.35 to 1.55, or 1.4 to 1.52. As the ratio ($D_2/D_1$) is within the above range, it is possible to provide a polyester film with excellent appearance and optical properties, along with excellent folding characteristics.

The polyester film according to an embodiment may have excellent folding characteristics at low temperatures as well as room temperature. Specifically, the polyester film according to an embodiment would not have cracks when repeatedly folded 100 times or more, 1,000 times or more, 10,000 times or more, 50,000 times or more, 100,000 times or more, 150,000 times or more, or 200,000 times or more, at −20° C. with a bending radius of 1.5 mm.

Composition of the Polyester Film

The polyester film according to an embodiment comprises a polyester resin. The polyester resin may be a homopolymer resin or a copolymer resin in which a dicarboxylic acid and a diol are polymerized (polycondensed). In addition, the polyester resin may be a resin in which the homopolymer resins or the copolymer resins are mixed.

The dicarboxylic acid may specifically be terephthalic acid, isophthalic acid, orthophthalic acid, 2,5-naphthalene dicarboxylic acid, 2,6-naphthalene dicarboxylic acid, 1,4-naphthalene dicarboxylic acid, 1,5-naphthalene dicarboxylic acid, diphenylcarboxylic acid, diphenoxyethane dicarboxylic acid, diphenylsulfonic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethyl malonic acid, succinic acid, 3,3-diethyl succinic acid, glutaric acid, 2,2-dimethylglutaric acid, adipic acid, 2-methyladipic acid, trimethyladipic acid, pimelic acid, azelaic acid, sebacic acid, suberic acid, dodecadicarboxylic acid, or a combination thereof, but it is not limited thereto.

The diol may specifically be ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, bis(4-hydroxyphenyl) sulfone, or a combination thereof, but it is not limited thereto.

Specifically, the polyester resin may be an aromatic polyester resin having excellent crystallinity. More specifically, it may be a resin having a polyethylene terephthalate (PET) resin as a main component.

As an example, the polyester film according to an embodiment may comprise a PET resin in an amount of about 85% by weight or more, 90% by weight or more, 95% by weight or more, or 99% by weight or more. In addition, the polyester film may comprise a polyester resin other than the PET resin. Specifically, the polyester film may comprise up to about 15% by weight of a polyethylene naphthalate (PEN) resin. More specifically, the polyester film may further comprise a PEN resin in an amount of about 0.1 to 10% by weight or 0.1 to 5% by weight.

Process for Preparing a Polyester Film

The polyester film according to an embodiment may be prepared by a process comprising biaxial stretching at specific stretching ratios and thermal treatment at a specific temperature.

Specifically, the process for preparing a polyester film according to an embodiment may comprise forming an unstretched sheet from a polyester resin; biaxial stretching it; and thermally treating it to prepare a polyester film having a thickness of 80 to 150 μm and a yield elongation in at least one direction of a first direction and a second direction perpendicular to each other in the plane of 2.2 to 2.6%. More specifically, in order to obtain a polyester film having specific characteristics in an embodiment, the extrusion and casting temperatures may be adjusted, the preheating temperature at the time of stretching, the stretching ratio in each direction, the stretching temperature, the stretching speed, and the like may be adjusted, and thermal treatment and relaxation may be carried out after stretching while the thermal treatment temperature and relaxation rate are adjusted, which will be described as follows.

First, a polyester resin is extruded to form an unstretched sheet. The extrusion of a polyester resin may be carried out at 230 to 300° C., 240 to 290° C., or 250 to 280° C.

The unstretched sheet thus formed may be subjected to a biaxial stretching process after being preheated. The preheating of the unstretched sheet may be carried out in the range of Tg+5° C. to Tg+50° C. based on the glass transition temperature (Tg) of the polyester resin. Specifically, it may be carried out in the range of 70° C. to 100° C. When the preheating is carried out within the above range, the unstretched sheet has flexibility suitable for biaxial stretching, so that the breakage of the sheet during biaxial stretching can be effectively prevented.

Biaxial stretching of the preheated unstretched sheet may be carried out through a simultaneous biaxial stretching method or a sequential biaxial stretching method. Specifically, the unstretched sheet may be biaxially stretched in the longitudinal direction (MD) and the transverse direction (TD) through a sequential biaxial stretching method in which the sheet is first stretched in one direction and then stretched in a direction perpendicular to that direction.

The speed at which the stretching is carried out is not particularly limited, but it may specifically be 6.5 to 8.5 m/minute. In addition, the temperature at which the stretching is carried out is not particularly limited, but it may specifically be 125° C. or higher, 130° C. or higher, or 135° C. or higher (e.g., 125 to 160° C., 130 to 155° C., 135 to 150° C., or 135 to 145° C.).

The stretching ratio in the longitudinal direction (MD) may be 2.5 to 3.0, specifically, 2.5 to 2.9, 2.5 to 2.8, or 2.5 to 2.7. In addition, the stretching ratio in the transverse direction (TD) may be 3.5 to 5.5, specifically, 3.5 to 5.4, 3.7 to 4.9, or 4.3 to 4.8. If the stretching ratio in each of the longitudinal direction (MD) and the transverse direction (TD) is within the above range, a polyester film having a uniform thickness and an optimum range of yield elongation can be obtained.

In addition, the ratio ($D_2/D_1$) of the stretching ratio ($D_2$) in the transverse direction (TD) to the stretching ratio ($D_1$) in the longitudinal direction (MD) may be 1.3 to 1.8, specifically, 1.3 to 1.75, 1.3 to 1.65, 1.33 to 1.6, 1.35 to 1.55, or 1.4 to 1.52. If the ratio ($D_2/D_1$) is within the above range, a polyester film having excellent transparency and flexibility and an optimum range of yield elongation can be obtained.

The film obtained through the stretching step may be subjected to a thermal treatment step. The thermal treatment may be carried out at a temperature of 180° C. or higher, 195° C. or higher, or 195 to 230° C., for 0.2 to 1 minute or 0.4 to 0.7 minute.

The film obtained through the thermal treatment step may be subjected to a relaxation step in which the film is relaxed in the longitudinal direction (MD) and/or the transverse direction (TD). The relaxation may be carried out at a temperature of 150 to 250° C. for 1 second to 1 minute, 2 seconds to 30 seconds, or 3 seconds to 10 seconds. The relaxation may be carried out at a relaxation rate of 1 to 10%, 2 to 7%, or 3 to 5%.

The film obtained through the relaxation step may be subjected to a cooling step. The cooling may be carried out at a temperature lower, by 50° C. to 150° C., than the temperature at which thermal treatment is carried out.

Laminate

The laminate according to an embodiment comprises a transparent substrate; and a polyester film, which will be described as follows.

The transparent substrate adopted in the laminate according to an embodiment may be a substrate having transparency and flexibility. Specifically, the transparent substrate may be a polymer film or a glass substrate.

The polymer film may specifically be a polyimide-based film. The polyimide-based film may comprise a polyimide-based polymer obtained by polymerizing at least one selected from the group consisting of a diamine compound, a dianhydride compound, and a dicarbonyl compound. The polyimide-based polymer may comprise an imide repeat unit derived from the polymerization of a diamine compound and a dianhydride compound and/or an amide repeat unit derived from the polymerization of a diamine compound and a dicarbonyl compound.

The diamine compound may be an aromatic diamine compound that contains an aromatic structure. Specifically, the diamine compound may be 2,2'-bis(trifluoromethyl)-4,4'-diaminobiphenyl (TFDB), oxydianiline (ODA), p-phenylenediamine (pPDA), m-phenylenediamine (mPDA), p-methylenedianiline (pMDA), bis(4-aminophenyl)fluorene (FDA), or a combination thereof, but it is not limited thereto.

The dianhydride compound may be, for example, an aromatic dianhydride compound that contains an aromatic structure or an alicyclic dianhydride compound that contains an alicyclic structure. Specifically, the dianhydride compound may be 2,2'-bis-(3,4-dicarboxyphenyl)hexafluoropropane dianhydride (6FDA), biphenyl-tetracarboxylic acid dianhydride (BPDA), or combinations thereof, but it is not limited thereto.

The dicarbonyl compound may be an aromatic dicarbonyl compound that contains an aromatic structure. Specifically, the dicarbonyl compound may be terephthaloyl chloride (TPC), 1,1'-biphenyl-4,4'-dicarbonyl dichloride (BPDC), isophthaloyl chloride (IPC), or a combination thereof, but it is not limited thereto.

For example, the polyimide-based polymer may comprise a repeat unit represented by the following Formula 1, but it is not limited thereto.

[Formula 1]

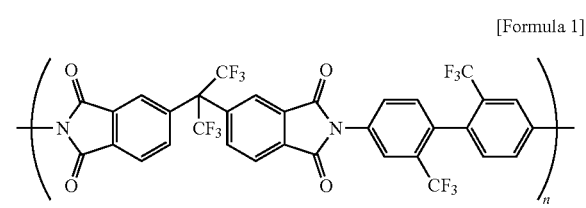

In Formula 1, n is an integer of 1 to 400.

In addition, the polyimide-based polymer may comprise at least one repeat unit represented by the following Formulae 2 to 4, but it is not limited thereto.

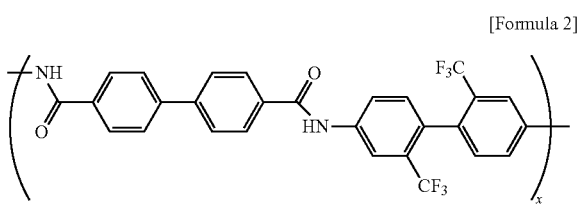

[Formula 2]

In Formula 2, x is an integer of 1 to 400.

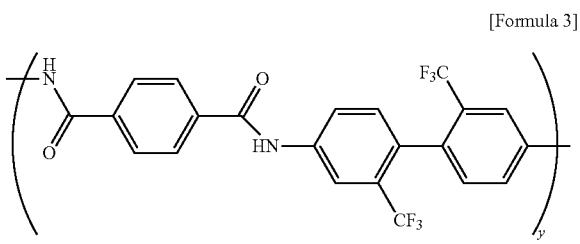

[Formula 3]

In Formula 3, y is an integer of 1 to 400.

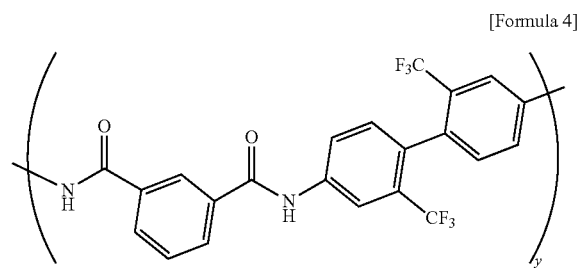

[Formula 4]

In Formula 4, y is an integer of 1 to 400.

Meanwhile, the glass substrate may specifically be ultra-thin glass (UTG).

The transparent substrate may have a thickness of 20 μm to 500 μm, 30 μm to 300 μm, or 40 μm to 100 μm.

In addition, the transparent substrate may have a surface hardness of HB or higher and a light transmittance of 80% or more at a wavelength of 550 nm. In addition, the transparent substrate may have a yellow index of 5 or less and a haze of 2% or less, based on a thickness of 50 μm.

The polyester film adopted in the laminate according to an embodiment may be a protective film for protecting the transparent substrate. In the polyester film, when a first direction and a second direction perpendicular to each other are defined in the plane of the film, the yield elongation in at least one direction of the first direction and the second direction is 2.2 to 2.6%, and the thickness is 80 μm or more (specifically, 80 μm to 150 μm). Specifically, the polyester film has substantially the same configuration and properties as those of the polyester film described above.

According to an embodiment, the laminate comprising the transparent substrate and the polyester film may withstand 100 times or more, 1,000 times or more, 10,000 times or more, 50,000 times or more, 100,000 times or more, 150,000 times or more, or 200,000 times or more of repeated folding until it is delaminated. When the number of repeated folding is within the above range, it can be advantageously applied to a foldable display device since it is not delaminated even upon frequent folding.

Specifically, since the laminate according to an embodiment has excellent transparency, flexibility, and folding characteristics, along with enhanced surface hardness as it comprises the polyester film described above, it can be advantageously applied as a cover material for a foldable display device.

Foldable Display Device

The foldable display device according to an embodiment comprises a foldable display panel, a transparent substrate, and a polyester film, which will be described as follows.

Figure 2:
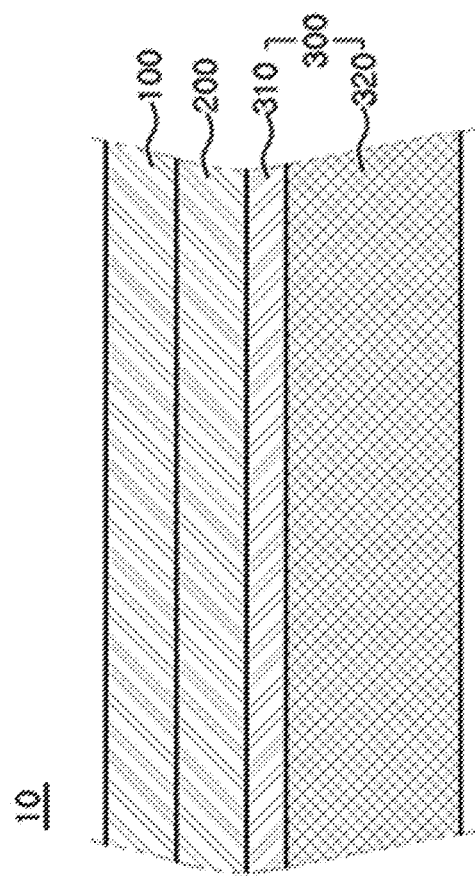
FIG. 2 is a reference drawing (cross-sectional drawing) for illustrating a foldable display device according to an embodiment.
Figure 3:
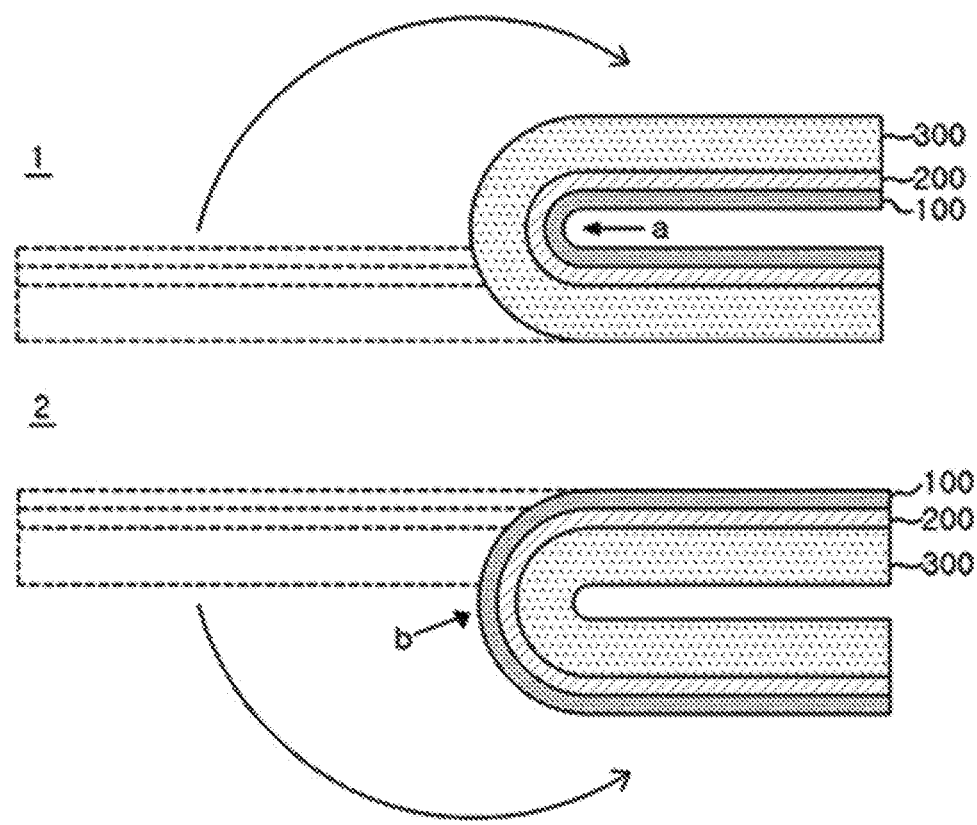
FIG. 3 is a schematic drawing that shows an in-folding type and out-folding type foldable display devices.

The foldable display panel adopted in the foldable display device according to an embodiment may be an organic light emitting display (OLED) panel or a quantum dot light emitting display (QLED) panel. As an example, FIG. 2 schematically shows a foldable display device (10) comprising a foldable display panel (300). The foldable display device (10) may comprise a front polarizing plate (310) and an organic light emitting display panel (320).

The front polarizing plate (310) may be disposed on the front side of the organic light emitting display panel (320). Specifically, the front polarizing plate (310) may be bonded to the side of the organic light emitting display panel (320) where an image is displayed.

The organic light emitting display panel (320) displays an image by self-emission of a pixel unit. The organic light emitting display panel (320) may comprise an organic light emitting substrate and a driving substrate. The organic light emitting substrate may comprise a plurality of organic light emitting units that correspond to respective pixels. The organic light emitting units each comprise a cathode, an electron transport layer, a light emitting layer, a hole transport layer, and an anode. The driving substrate is operatively coupled to the organic light emitting substrate. That is, the driving substrate may drive the organic light emitting substrate by applying a current to each of the organic light emitting units.

The transparent substrate (200) adopted in the foldable display device (10) according to an embodiment is disposed on the foldable display panel (300) as a transparent cover. The transparent substrate (200) has substantially the same configuration and characteristics as those of the transparent substrate described in the laminate.

The polyester film (100) adopted in the foldable display device (10) according to an embodiment is disposed on the transparent substrate (200) as a protective film. The polyester film (100) has substantially the same configuration and properties as those of the polyester film described above.

The foldable display device (10) according to an embodiment may be an in-folding type or an out-folding type depending on the folding direction.

Since the foldable display device according to an embodiment comprises the polyester film as a protective film, it exhibits excellent folding characteristics, while its lifespan and reliability are excellent even when an external force is applied to the surface for a long period of time or over a number of times (e.g., use of a touch pen).

MODE FOR THE INVENTION

Hereinafter, the present embodiments will be described in detail with reference to Examples, but the scope of the present embodiments is not limited to the Examples.

Preparation of a Polyester Film

Examples 1 to 11

A polyethylene terephthalate (PET) resin was extruded at a temperature of about 250 to 280° C. in an extruder and cast to prepare an unstretched sheet. The unstretched sheet was preheated and biaxially stretched while the stretching ratios in the longitudinal direction (MD) and the transverse direction (TD) were adjusted, respectively, to obtain a stretched sheet. Then, the stretched sheet was heat-set, relaxed at a relaxation rate of 3 to 5% for 3 to 10 seconds, and cooled, thereby preparing a polyester film having a thickness of 100 µm. Here, the preheating temperature, the stretching ratio in each direction, the ratio of the stretching ratios, the stretching temperature, and the heat-setting temperature were adjusted as shown in Table 1 below.

Comparative Examples 1 to 11

Polyester films having a thickness of 100 µm were each prepared in the same manner as in Example 1, except that the preheating temperature, the stretching ratio in each direction, the ratio of the stretching ratios, the stretching temperature, and the heat-setting temperature were adjusted as shown in Table 1 below.

Comparative Examples 12

A polyester film having a thickness of 50 µm was prepared in the same manner as in Example 1, except that the preheating temperature, the stretching ratio in each direction, the ratio of the stretching ratios, the stretching temperature, and the heat-setting temperature were adjusted as shown in Table 1 below.

gauge distance of the specimen (sample) was 50 mm, the tensile speed was 50 mm/minute, and an offset (yield point) of 0.2% was applied.

Test Example 2: Evaluation of Thickness Deviation 10 cm in the longitudinal direction (MD) and the total width in the transverse direction (TD) of each polyester film was taken, which was measured for the thickness deviation using a thickness profiler (PR2000-B-220 of Solvetech). The results are shown in Table 2 below. Here, the test standard was in accordance with ASTM D8136-7. The thickness in the transverse direction (TD) was recorded from the result, and the deviation of the maximum and minimum thicknesses was calculated.

Test Example 3: Evaluation of Elongation

Each polyester film was cut into 100 mm in the direction to be measured (e.g., longitudinal direction (MD)) and 15 mm in a direction perpendicular thereto (e.g., transverse direction (TD)) to prepare a specimen, which was measured for the elongation using a universal testing machine (UTM, 5566A of INSTRON) under the following conditions. The results are shown in Table 2 below.
Specimen focal (gauge) length: 50 mm
Measurement temperature: room temperature
Tensile speed: 50 mm/minute

TABLE 1

| | Thickness (µm) | Preheating temp. (° C.) | Stretching ratio in the longitudinal direction ($D_1$) | Stretching ratio in the transverse direction ($D_2$) | Ratio of stretching ratios ($D_2/D_1$) | Stretching temp. (° C.) | Heat-setting temp. (° C.) |
|---|---|---|---|---|---|---|---|
| Ex. 1 | 100 | 98 | 2.5 | 3.5 | 1.4 | 140 | 220 |
| Ex. 2 | 100 | 98 | 2.5 | 3.7 | 1.48 | 140 | 220 |
| Ex. 3 | 100 | 98 | 2.5 | 3.8 | 1.52 | 140 | 220 |
| Ex. 4 | 100 | 98 | 2.5 | 4.3 | 1.72 | 140 | 220 |
| Ex. 5 | 100 | 98 | 2.5 | 4.5 | 1.8 | 140 | 220 |
| Ex. 6 | 100 | 98 | 2.7 | 3.51 | 1.3 | 140 | 220 |
| Ex. 7 | 100 | 98 | 2.7 | 4.32 | 1.6 | 140 | 220 |
| Ex. 8 | 100 | 98 | 2.7 | 4.86 | 1.8 | 140 | 220 |
| Ex. 9 | 100 | 98 | 3.0 | 3.9 | 1.3 | 140 | 220 |
| Ex. 10 | 100 | 98 | 3.0 | 4.8 | 1.6 | 140 | 220 |
| Ex. 11 | 100 | 98 | 3.0 | 5.4 | 1.8 | 140 | 220 |
| C. Ex. 1 | 100 | 98 | 2.5 | 3.2 | 1.28 | 140 | 220 |
| C. Ex. 2 | 100 | 98 | 2.5 | 3.23 | 1.29 | 140 | 220 |
| C. Ex. 3 | 100 | 98 | 2.8 | 3.62 | 1.29 | 140 | 220 |
| C. Ex. 4 | 100 | 98 | 2.8 | 3.5 | 1.25 | 140 | 220 |
| C. Ex. 5 | 100 | 98 | 3.0 | 3.87 | 1.29 | 140 | 220 |
| C. Ex. 6 | 100 | 98 | 3.0 | 3.8 | 1.27 | 140 | 220 |
| C. Ex. 7 | 100 | 98 | 3.1 | 4.1 | 1.32 | 140 | 220 |
| C. Ex. 8 | 100 | 98 | 3.1 | 4.5 | 1.45 | 140 | 220 |
| C. Ex. 9 | 100 | 98 | 3.3 | 3.5 | 1.06 | 140 | 220 |
| C. Ex. 10 | 100 | 98 | 3.3 | 4.25 | 1.29 | 140 | 220 |
| C. Ex. 11 | 100 | 98 | 3.5 | 4.2 | 1.2 | 140 | 220 |
| C. Ex. 12 | 50 | 75 | 3.4 | 4.0 | 1.18 | 120 | 240 |

Test Example 1: Evaluation of Yield Elongation

Each polyester film was cut into a width of 15 mm and a length of 100 mm to prepare a specimen, which was measured for the yield elongation in the longitudinal direction ($E_1$) and the yield elongation in the transverse direction ($E_2$) using a universal testing machine of Instron, respectively. The results are shown in Table 2 below. Here, the The tensile force was continued until the specimen fractured, the tensile rate at which point was taken as elongation (%).

Test Example 4: Evaluation of Haze

Each polyester film was cut into a size of 100 mm×100 mm to prepare a specimen, which was measured for the haze using a haze meter (Gardner BYK). The results are shown in Table 2 below. Here, samples were taken from a total of 10 locations, the maximum and minimum values among the measured values were discarded, and the haze was calculated as the average of the remaining values.

Test Example 5: Evaluation of Surface Hardness

Each polyester film was cut into a size of 100 mm×100 mm to prepare a specimen, which was measured for the surface hardness using a nano hardness tester (Nano Test Vantage Platform of Micro Materials). The results are shown in Table 2 below. The tip of the nano hardness meter penetrated to a depth of 3 μm, and the hardness measured at which point was taken as the surface hardness value.

Test Example 6: Evaluation of Folding Characteristics

Each polyester film was cut into a width of 50 mm and a length of 200 mm to prepare a specimen, which was subjected to a repeated folding test of 200,000 times in the longitudinal direction (MD) (using U-shape folding equipment of YUASA) to evaluate the folding characteristics. The results are shown in Table 2 below. Here, it was set to be folded 60 times per minute with a bending radius of 1.5 mm, and 200,000 times of folding were carried out at room temperature and a low temperature (−20° C.), respectively. Upon completion of 200,000 times of folding, the surface of the folding area was observed with a scanning electron microscope (SEM) to check whether cracks had been formed. The case with cracks was marked as "○," and the case without cracks was marked as "x."

Referring to Table 2 above, the polyester films of Examples 1 to 11 in which the yield elongation was in the range of 2.2 to 2.6% were excellent in all of the flexibility, transparency, and folding characteristics even at a relatively thick thickness of 100 μm.

EXPLANATION OF REFERENCE NUMERALS

10: foldable display device
100: polyester film
200: transparent substrate
300: foldable display panel
310: front polarizing plate
320: organic light emitting display panel

The invention claimed is:

1. A polyester film, wherein when a first direction and a second direction perpendicular to each other are defined in the plane of the film, the yield elongation in at least one direction of the first direction and the second direction is 2.2 to 2.6%, and the thickness is 80 to 150 μm,
   wherein the first direction is the longitudinal direction (MD), the second direction is the transverse direction (TD), and the stretching ratio in the longitudinal direction is 2.5 to 3.0, and
   wherein the ratio (D2/D1) of the stretching ratio (D2) in the transverse direction (TD) to the stretching ratio (D1) in the longitudinal direction (MD) is 1.3 to 1.8.

2. The polyester film of claim 1, wherein the first direction is the longitudinal direction (MD), the second direction is the transverse direction (TD), and the stretching ratio in the transverse direction is 3.5 to 5.5.

TABLE 2

| | Yield elongation in the longitudinal direction ($E_1$) (%) | Yield elongation in the transverse direction ($E_2$) (%) | Ratio of yield elongations ($E_1/E_2$) | Thickness deviation (μm) | Elongation (%) MD | Elongation (%) TD | Haze | Surface hardness | Folding characteristics Room temp. | Folding characteristics Low temp. (−20° C.) |
|---|---|---|---|---|---|---|---|---|---|---|
| Ex. 1 | 2.31 | 1.93 | 1.20 | 2.0 | 150 | 140 | 0.91 | 146 | x | x |
| Ex. 2 | 2.34 | 1.89 | 1.24 | 1.5 | 145 | 130 | 0.95 | 161 | x | x |
| Ex. 3 | 2.44 | 1.91 | 1.28 | 1.5 | 151 | 147 | 0.96 | 154 | x | x |
| Ex. 4 | 2.50 | 1.90 | 1.31 | 2.0 | 153 | 142 | 1.0 | 155 | x | x |
| Ex. 5 | 2.60 | 1.87 | 1.40 | 1.5 | 131 | 122 | 0.97 | 160 | x | x |
| Ex. 6 | 2.25 | 1.90 | 1.18 | 1.5 | 147 | 146 | 0.97 | 149 | x | x |
| Ex. 7 | 2.31 | 1.89 | 1.22 | 1.5 | 152 | 139 | 0.98 | 157 | x | x |
| Ex. 8 | 2.52 | 1.89 | 1.33 | 2.0 | 147 | 144 | 0.96 | 143 | x | x |
| Ex. 9 | 2.20 | 1.92 | 1.15 | 1.0 | 144 | 146 | 0.91 | 150 | x | x |
| Ex. 10 | 2.36 | 1.89 | 1.25 | 1.0 | 139 | 141 | 0.95 | 166 | x | x |
| Ex. 11 | 2.47 | 1.89 | 1.31 | 1.5 | 131 | 152 | 0.89 | 159 | x | x |
| C. Ex. 1 | 2.13 | 2.05 | 1.04 | 2.5 | 143 | 157 | 0.91 | 147 | x | ○ |
| C. Ex. 2 | 2.15 | 2.06 | 1.04 | 2.5 | 152 | 149 | 0.96 | 141 | x | ○ |
| C. Ex. 3 | 2.08 | 2.01 | 1.03 | 2.0 | 147 | 143 | 0.87 | 146 | x | ○ |
| C. Ex. 4 | 2.05 | 2.04 | 1.00 | 1.5 | 127 | 140 | 0.89 | 139 | x | ○ |
| C. Ex. 5 | 2.07 | 1.98 | 1.05 | 2.0 | 131 | 152 | 1.0 | 147 | ○ | ○ |
| C. Ex. 6 | 2.05 | 1.95 | 1.05 | 1.5 | 121 | 148 | 0.97 | 159 | ○ | ○ |
| C. Ex. 7 | 2.03 | 1.97 | 1.03 | 1.5 | 135 | 147 | 0.96 | 160 | ○ | ○ |
| C. Ex. 8 | 2.00 | 1.91 | 1.05 | 2.5 | 136 | 145 | 0.92 | 151 | ○ | ○ |
| C. Ex. 9 | 1.98 | 1.99 | 0.99 | 2.0 | 116 | 148 | 0.91 | 149 | ○ | ○ |
| C. Ex. 10 | 1.96 | 1.96 | 1.00 | 2.5 | 109 | 143 | 0.96 | 152 | ○ | ○ |
| C. Ex. 11 | 1.95 | 1.89 | 1.03 | 2.5 | 116 | 151 | 0.90 | 155 | ○ | ○ |
| C. Ex. 12 | 1.94 | 1.87 | 1.04 | 2.0 | 109 | 141 | 0.89 | 117 | x | x |

3. The polyester film of claim 1, which has a thickness of 90 to 120 μm.

4. The polyester film of claim 1, wherein the first direction is the longitudinal direction (MD), the second direction is the transverse direction (TD), and
the yield elongation (E1) in the longitudinal direction (MD) is 2.2 to 2.6%,
the polyester film satisfying the following Relationship (1):

$$1.1 \leq E1/E2 \leq 1.4 \quad (1)$$

in Relationship (1), E1 is the yield elongation in the longitudinal direction (MD), and E2 is the yield elongation in the transverse direction (TD).

5. The polyester film of claim 1, wherein the first direction is the longitudinal direction (MD), the second direction is the transverse direction (MD), and
the yield elongation (E1) in the longitudinal direction (MD) is 2.2 to 2.6%,
the polyester film satisfying the following Relationship (2):

$$0.01 \leq D1 \times E1/T \leq 0.1 \quad (2)$$

in Relationship (2), D1 is the stretching ratio in the longitudinal direction (MD), E1 is the yield elongation in the longitudinal direction (MD), and T is the thickness of the polyester film.

6. The polyester film of claim 1, which has a thickness deviation of 3 μm or less, an elongation of 40% or more, a haze of 2.0% or less, and a surface hardness of 120 N/mm2 or more.

7. The polyester film of claim 1, which is devoid of the formation of cracks when subjected to repeated folding of 200,000 times with a bending radius of 1.5 mm at −20° C.

8. The polyester film of claim 1, which comprises a polyethylene terephthalate (PET) resin.

9. A laminate, which comprises a transparent substrate; and a polyester film disposed on the transparent substrate,
wherein when a first direction and a second direction perpendicular to each other are defined in the plane of the polyester film, the yield elongation in at least one direction of the first direction and the second direction is 2.2 to 2.6%, and the thickness of the film is 80 to 150 μm,
wherein the first direction is the longitudinal direction (MD), the second direction is the transverse direction (TD), and the stretching ratio in the longitudinal direction is 2.5 to 3.0, and
wherein the ratio (D2/D1) of the stretching ratio (D2) in the transverse direction (TD) to the stretching ratio (D1) in the longitudinal direction (MD) is 1.3 to 1.8.

10. The laminate of claim 9, wherein the transparent substrate is a polyimide-based film or ultra-thin glass (UTG).

11. A foldable display device, which comprises a foldable display panel; a transparent substrate disposed on the foldable display panel; and a polyester film disposed on the transparent substrate,
wherein when a first direction and a second direction perpendicular to each other are defined in the plane of the polyester film, the yield elongation in at least one direction of the first direction and the second direction is 2.2 to 2.6%, and the thickness of the film is 80 to 150 μm,
wherein the first direction is the longitudinal direction (MD), the second direction is the transverse direction (TD), and the stretching ratio in the longitudinal direction is 2.5 to 3.0, and
wherein the ratio (D2/D1) of the stretching ratio (D2) in the transverse direction (TD) to the stretching ratio (D1) in the longitudinal direction (MD) is 1.3 to 1.8.

* * * * *